(12) United States Patent
Canton

(10) Patent No.: US 10,182,104 B1
(45) Date of Patent: Jan. 15, 2019

(54) AUTOMATIC PROPAGATION OF RESOURCE ATTRIBUTES IN A PROVIDER NETWORK ACCORDING TO PROPAGATION CRITERIA

(71) Applicant: Amazon Technologies, Inc., Reno, NV (US)

(72) Inventor: Jeffrey Cicero Canton, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 533 days.

(21) Appl. No.: 14/563,750

(22) Filed: Dec. 8, 2014

(51) Int. Cl.
*H04L 29/08* (2006.01)
*H04L 12/24* (2006.01)

(52) U.S. Cl.
CPC .......... *H04L 67/10* (2013.01); *H04L 41/0813* (2013.01)

(58) Field of Classification Search
None
See application file for complete search history.

(56) References Cited

U.S. PATENT DOCUMENTS

| | | | |
|---|---|---|---|
| 6,718,390 B1 | 4/2004 | Still et al. | |
| 7,548,985 B2 | 6/2009 | Guigui | |
| 7,617,289 B2 | 11/2009 | Srinivasan et al. | |
| 7,870,475 B2 | 1/2011 | Schachter | |
| 7,958,087 B2 | 6/2011 | Blumenau | |
| 8,023,437 B1 * | 9/2011 | Chapweske | H04L 12/1813 370/261 |
| 8,144,632 B1 * | 3/2012 | Chapweske | H04L 12/1881 370/238 |
| 8,848,659 B2 * | 9/2014 | Cubic | 370/331 |
| 9,112,777 B1 | 8/2015 | Barclay et al. | |
| 2013/0162755 A1 * | 6/2013 | Swanson | H04N 7/155 348/14.08 |
| 2013/0212214 A1 * | 8/2013 | Lawson | H04L 43/04 709/217 |
| 2014/0052877 A1 * | 2/2014 | Mao | H04L 61/103 709/245 |
| 2014/0082131 A1 * | 3/2014 | Jagtap | G06F 9/5072 709/217 |

(Continued)

FOREIGN PATENT DOCUMENTS

WO 2010074655 7/2010

OTHER PUBLICATIONS

U.S. Appl. No. 14/563,747, filed Dec. 8, 2014, Jeffrey Cicero Canton et al.

*Primary Examiner* — Ninos Donabed
(74) *Attorney, Agent, or Firm* — Robert C. Kowert; Meyertons, Hood, Kivlin, Kowert & Goetzel, P.C.

(57) ABSTRACT

A provider network that implements different resources for a client may provide automatic propagation of resource attributes to the different resources according to propagation criteria. Propagation criteria may be received that indicates a logical structure for multiple resources of a provider network. These resources may or may not be currently deployed. In response to a request to initiate propagation of resource attributes to the multiple resources, the multiple resources may be identified according to a logical structure identified as part of the propagation criteria and the resource attributes applied to the identified resources. Upon completion of propagation, a notification of completion may be provided.

21 Claims, 8 Drawing Sheets

(56) References Cited

U.S. PATENT DOCUMENTS

| | | | | |
|---|---|---|---|---|
| 2014/0082156 A1* | 3/2014 | Jagtap | ............... | G06F 9/5027 709/220 |
| 2014/0122613 A1* | 5/2014 | Mashkif | ............ | G06Q 10/101 709/205 |
| 2015/0200958 A1* | 7/2015 | Muppidi | ............. | H04L 41/28 726/23 |
| 2015/0295980 A1* | 10/2015 | Davis | ............. | H04M 3/53325 709/219 |
| 2015/0341469 A1* | 11/2015 | Lawson | ............ | G05B 19/4185 709/203 |
| 2017/0235848 A1* | 8/2017 | Van Dusen | ............ | H04L 41/04 705/12 |

* cited by examiner

AUTOMATIC PROPAGATION OF RESOURCE ATTRIBUTES IN A PROVIDER NETWORK ACCORDING TO PROPAGATION CRITERIA

BACKGROUND

Cloud-based infrastructure offers many advantages for companies, developers, or other entities that may implement new systems and technologies leveraging the accessibility, flexibility, and reliability. Many different types of services, systems, or functions may be implemented using cloud-based resources for client systems or devices. For example, cloud-based resources, such as virtual compute instances, may be used to implement a network-based service for external customers, such as an e-commerce platform. Cloud-based resources may also be used to implement a service or tool for internal customers, such as information technology (IT) service implemented as part of an internal network for a corporation. Cloud-based resources, such as virtual networks, may be used to direct or control network traffic in order to perform the various functions or tasks provided by the services or functions performed utilizing other cloud-based resources, in another example. Instead of investing resources in acquiring various hardware and software components, cloud-based resources may be procured to provide the infrastructure upon which these new systems and technologies may be built.

Cloud-based resources are often provided by a provider network, which may include many different types of network-based services that can be used to implement cloud-based infrastructure resources. Developers can request, provision, and configure various different cloud-based resources from the network-based services offered as part of the development of new systems and products. However, as infrastructure requirements become more complex, the development costs to procure, configure, and test cloud-based resources may increase, as the time and expertise needed to configure and test different respective network-based services in the provider network may increase. Moreover, as the demand to rapidly develop new systems and products in the cloud grows, the speed at which development may occur becomes even more important to compete effectively. Thus, various organizational techniques to label and/or categorize resources implemented in a provider network have become increasingly important.

Figure 1A:
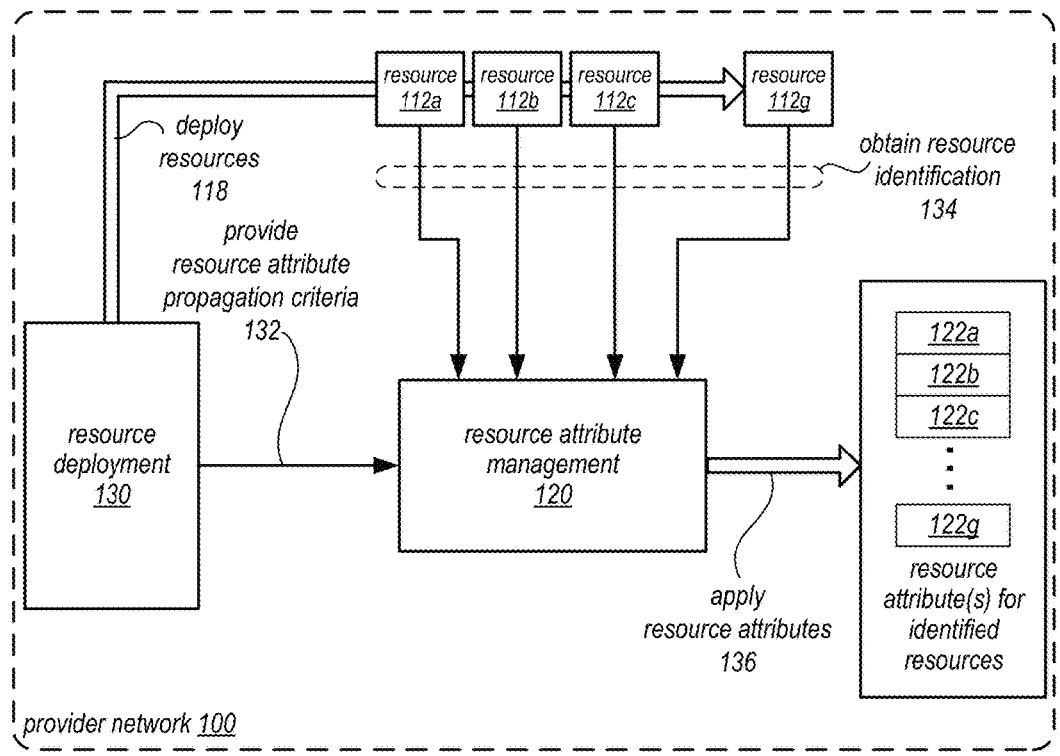
FIG. 1A is a logical data flow diagram illustrating automatic propagation of resource attributes in a provider network according to a resource attribute propagation criteria, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement automated management of resource attributes across network-based services, according to some embodiments. A provider network may supply clients, operators, or other customers with access to and/or control of resources implemented by different network-based services that are implemented as part of the provider network. These resources may include various types of computing systems or devices configured for communication over a network that provide several different kinds of services, from computing or processing services, storage services, to database services or content delivery services. For example, in some embodiments, a provider network may include a virtual computing service that provides virtual computing resources to clients, users, or other type of customers, in the form of compute instances (e.g., a virtual machine acting as a distinct logical computing system that provides users with the illusion that they are the sole operators and administrators of a given hardware computing resource).

Clients of the provider network may reserve (i.e., purchase or buy) one or more resources (such as compute instances) to perform various functions, services, techniques, and/or applications. Various different configurations of the resources may be determined, arranged, or developed in order to implement these desired functions, services, techniques, and/or applications. For instance, one or more virtual compute instances may be configured using a particular machine image (e.g., a software stack) that has been developed to implement a particular application and placed within a particular virtual network resource configured to include the virtual compute instances. Once these virtual compute instances are configured and launched, it may then be desirable to tag, track, or organize these instances, and other provider network resources that have been acquired for a client of the provider network.

In various embodiments, resource attributes may be implemented to describe, identify, and interact with the resources of a provider network. For example, a client may automate various management actions for a system composed of resources implemented in a provider network, from deploying new resources, to separating out production and development resources. However, as noted above, a provider network may offer many different types of network-based services that may have specific means for interacting with a client. Various different programmatic interfaces (APIs), for instance, may be used to communicate with, setup, and configure resources for each of the network-based services. Thus, complex infrastructures or configurations of resources implemented via the use of multiple network-based services in the provider network may require many separate interactions to manage resource attributes, if resource adding/modifying/removing resource attributes is limited to those resources provided by a particular network-based service. Moreover, as the number of resources may dynamically change (e.g., due to various scaling and other virtual computing mechanisms), manual attribution of resources may grow cumbersome and costly.

In some scenarios, it may be desirable to apply a common set of resource attribute(s) to multiple resources which together make up some entity, system, collection, or service for a client of the provider network. For instance, resources in a provider network may implement an e-commerce platform, including a web-site, inventory management system, billing, system, and various support services and data stores to facilitate the e-commerce platform for a client of the provider network. Resource attributes describing a component of the e-commerce platform, such as billing, may be have various environmental and/or descriptive resource attributes in common. Thus, when deploying (or having already deployed) the resources in the provider network to implement the billing component, it may be desirable to propagate the common resource attributes to the multiple different resources implementing the billing component.

FIG. 1A is a logical data flow diagram illustrating automatic propagation of resource attributes in a provider network according to resource attribute propagation criteria, according to some embodiments. Provider network 100 may implement various different network-based services. Clients may procure respective resources, 112a, 112b, 112c through 112n at these various services in order to perform various tasks. In at least some embodiments, provider network 100 may provide resource deployment 130 to coordinate and manage the instantiation and deployment of resources 112 in provider network 100. Provider network 100 may implement a resource attribute management module to provide a centralized resource attribute manager for resources 112.

A resource attribute may, in various embodiments, be a tag, label, set of metadata, or any other descriptor or information corresponding to a provider network resource, implemented at one of various network-based services of the provider network. Attributes may be represented in various ways, such as a key-value pair, multiple values, or any other arrangement of information descriptive of the resource. Resource attributes for a resource may be maintained as part of resource metadata for the resources at network-based services. Network-based services may create resource metadata and/or attributes when a resource is created by a client. However, a client may wish to modify, remove, and/or add new resources attributes to the resource metadata in order to provide greater flexibility for automating various interactions within the resources utilizing resource metadata. As noted above, in at least some embodiments a client may wish to apply one or more resource attributes to a set of resources, such as resources 112.

Figure 1B:
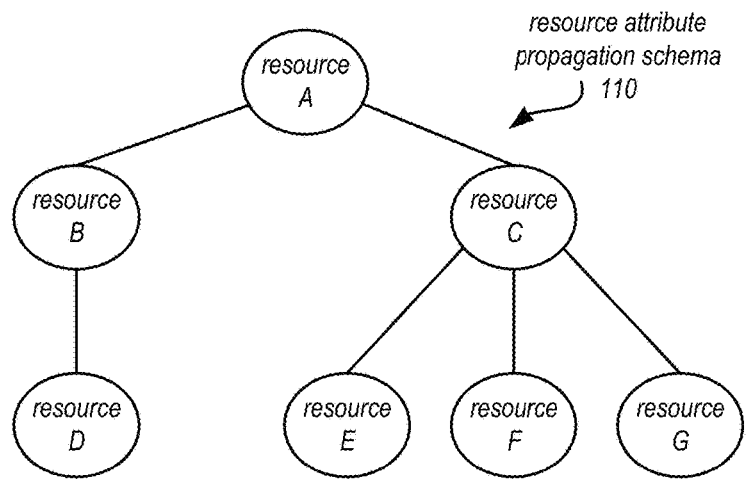
FIG. 1B is an example of resource propagation criteria, according to some embodiments.

Resource deployment module 130 may provide resource attribute propagation criteria 132 to resource attribute management module 120 in order to propagate resource attributes to the resources 112. Resource propagation criteria may be represented in many different ways. Criteria may, for instance, describe a set of relationships (e.g., a list or set of resource pairings), which indicate the logical structure of the resources. FIG. 1B is a resource propagation schema, which may be an example of an example of resource propagation criteria, according to some embodiments. Resource attribute propagation criteria, such as the illustrated schema 110, may be represented in many ways to provide a logical structure of the resources which are being linked to resource attributes automatically. In FIG. 1B, resource attribute propagation schema 110 is illustrated as a tree which identifies the resources to propagate resource attributes to (e.g., resource A corresponds to resource 112a, resource B corresponds to resource 112b, etc. . . . ). Using schema 110, one or more orderings or paths for propagating resources may be utilized by resource attribute management module 120. For example, propagation may start with resource A, and continue on to Resource B and/or Resource. If performing a breadth-first type of path, propagation may occur to resource B and resource C before proceeding to a deeper level in schema 110. Alternatively, resource B and resource D may have the attribute applied before resources C, E, F, and G (and vice versa). However utilized, resource propagation schema 110 may be used to select and identify resources for propagation (as discussed below with regard to FIG. 7), and may thus provide deep resource attribution for a set of resources. T Resource deployment 130 may deploy resources 118, in various embodiments. These resources may be deployed together or separately. In some embodiments, some resources may be utilized to deploy other resources. For example, resource A may be deployed, which then deploys resources B and C. However, in some embodiments, the various resources in the logical structure of the resource attribute propagation schema may be deployed differently than the logical structure of the resources indicated in the resource attribute propagation schema.

In some embodiments, resource deployment 130 may initiate resource attribute propagation for one or more resource attributes (not illustrated), sending a request to initiate to resource attribute management 120. Resource attribute management may obtain resource identification information 134 for the resources 112, in various embodiments. For example, as discussed below with regard to FIGS. 4 and 7, resource attribute management 120 may send requests for identification information to the resources 112 and/or network-based services implementing the resources 112. In some embodiments, resources 112 may provide identification information to resource attribute management 120. Based on respective identification information for each resource 112, resource attribute management 120 may apply the resource attributes to the maintained for the different resources 112. For example resource attributes 122a may be maintained for resource 112a, resource attributes 122b may be maintained for resource 112b, and so on. The identification information may be used, in various embodiments, to create and or locate the portion resource metadata (e.g., record or row in a database table) for the particular resource to which the new resource attributes are to be added. As resources 112 may be deployed at different times and ways, the identification and application of resources may be performed until all of the resources have been attributed with the new resource attributes. In some embodiments, resource attribute management 120 may provide a status update and/or completion notification to resource deployment 130.

Please note that previous descriptions are not intended to be limiting, but are merely provided as a logical example of a provider network, network-based services, clients, and resource attribute management. Various other components may interact with or assist in implementing a service platform specific language.

This specification next includes a general description of a provider network, which may implement a resource tag service to provide automatic propagation of resource attributes in a provider network according to a resource propagation schema. Various examples of a provider network, resource tag service, network-based services and clients are discussed, including different components/modules, or arrangements of components/module that may be employed as part of a resource tag service. A number of different methods and techniques to implement automatic propagation of resource attributes in a provider network according to a resource propagation schema are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
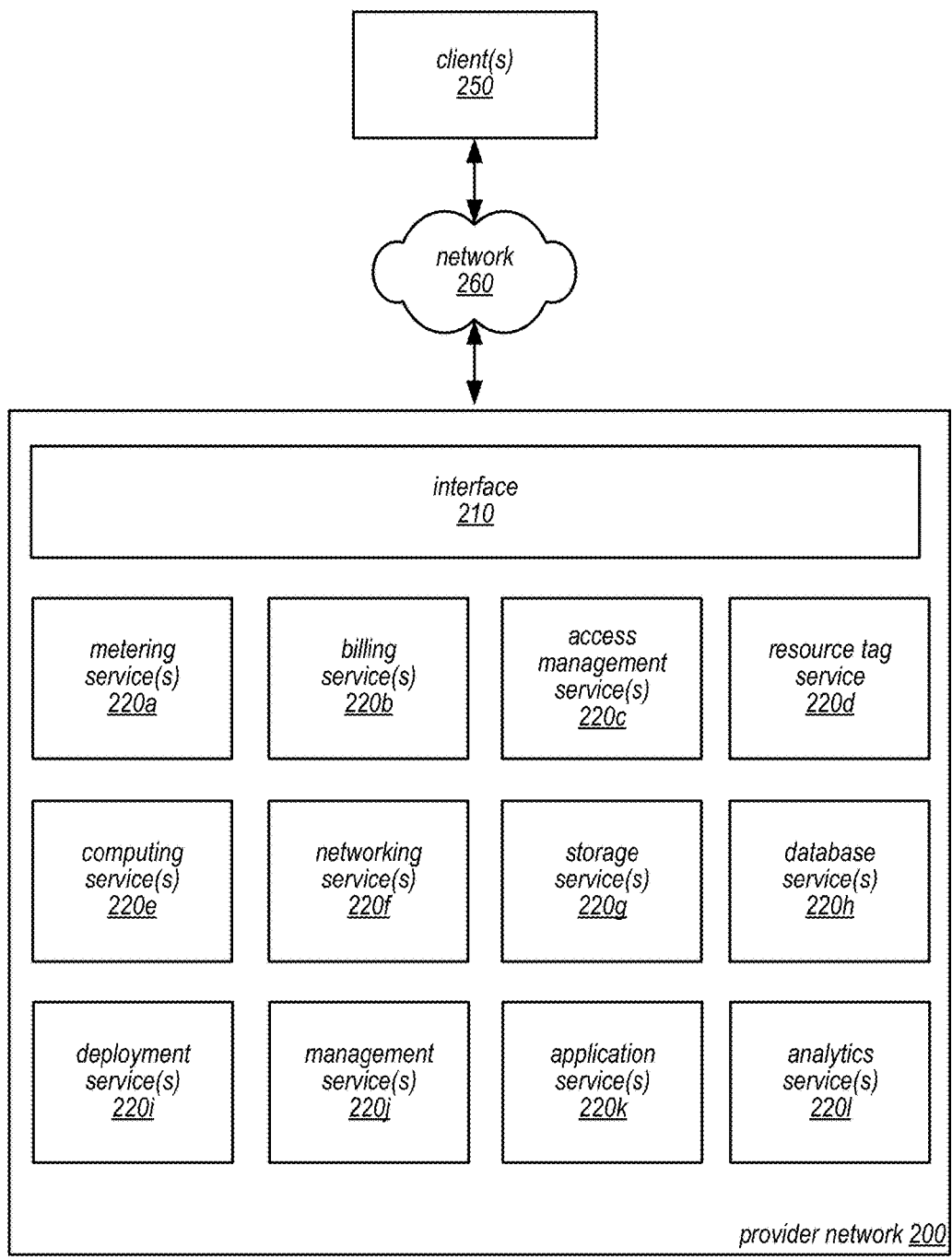
FIG. 2 is block diagram illustrating a provider network that implements multiple different network-based services for clients, including a resource tag service, according to some embodiments.

FIG. 2 is block diagram illustrating a provider network that implements multiple different network-based services for clients, including a resource tag service, according to some embodiments. Provider network 200 may be set up by an entity such as a company or a public sector organization to provide one or more network-based services (such as various types of cloud-based computing or storage) accessible via the Internet and/or other networks to clients 250. Provider network 200 may include numerous data centers hosting various resource pools, such as collections of physical and/or virtualized computer servers, storage devices, networking equipment and the like, needed to implement and distribute the infrastructure and services offered by the provider network 200. Clients 250 may be configured to access via network 260 network-based services implemented as part of provider network 200 to perform various tasks, implement various systems, functions, or applications.

Provider network 200 may implement many different kinds of services, and thus the following discussion of various services is not intended to be limiting. For example, various network-based services may be implemented such as computing service(s) 220*e*, networking services(s) 220*f*, storage service(s) 220*g*, database service(s) 220*h*, deployment service(s) 220*i*, management service(s) 220*j*, application service(s) 220*k*, and analytic service(s) 220*l*.

In some embodiments, provider network 200 may implement virtual computing service 220*e*, to provide computing resources. These computing resources may in some embodiments be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor) or machine image. A number of different types of computing devices may be used singly or in combination to implement compute instances, in different embodiments, including general purpose or special purpose computer servers, storage devices, network devices and the like. In some embodiments clients 250 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 250 applications, without for example requiring the client 250 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

Provider network 200 may implement networking service(s) 220*f* in some embodiments. Networking service(s) 220*f* may configure or provide virtual networks, such as virtual private networks (VPNs), among resources implemented in provider network 200 as well as control access with external systems or devices. For example, networking service(s) 220*f* may be configured to implement security groups for compute instances in a virtual network. Security groups may enforce one or more network traffic policies for network traffic at members of the security group.

Membership in a security group may not be related to physical location or implementation of a compute instance. The number of members or associations with a particular security group may vary and may be configured.

Networking service(s) 220f may manage or configure the internal network for provider network 200 (and thus may be configured for implementing various resources for a client 250). For example, an internal network may utilize IP tunneling technology to provide a mapping and encapsulating system for creating an overlay network on network and may provide a separate namespace for the overlay layer and the internal network layer. Thus, in this example, the IP tunneling technology provides a virtual network topology; the interfaces that are presented to clients 250 may be attached to the overlay network so that when a client 250 provides an IP address that they want to send packets to, the IP address is run in virtual space by communicating with a mapping service (or other component or service not illustrated) that knows where the IP overlay addresses are.

Storage service(s) 220g may be one or more different types of services that provide different types of storage. For example, storage service(s) 220g may be an object or key-value data store that provides highly durable storage for large amounts of data organized as data objects. In some embodiments, storage service(s) 220g may include an archive long-term storage solution that is highly-durable, yet not easily accessible, in order to provide low-cost storage. In some embodiments, storage service(s) 220g may provide virtual block storage for other computing devices, such as compute instances implemented as part of virtual computing service 240. For example, a virtual block-based storage service 220g may provide block level storage for storing one or more data volumes mapped to particular clients, providing virtual block-based storage (e.g., hard disk storage or other persistent storage) as a contiguous set of logical blocks. Storage service(s) 220g may replicate stored data across multiple different locations, fault tolerant or availability zones, or nodes in order to provide redundancy for durability and availability for access.

In some embodiments, provider network 200 may implement database service(s) 220h. Database services 220h may include many different types of databases and/or database schemas. Relational and non-relational databases may be implemented to store data, as well as row-oriented or column-oriented databases. For example, a database service that stores data according to a data model in which each table maintained on behalf of a client contains one or more items, and each item includes a collection of attributes, such as a key value data store. In such a database, the attributes of an item may be a collection of name-value pairs, in any order, and each attribute in an item may have a name, a type, and a value. Some attributes may be single valued, such that the attribute name is mapped to a single value, while others may be multi-value, such that the attribute name is mapped to two or more values.

In various embodiments, provider network 200 may implement deployment service(s) 220i. Deployment service(s) 220i may include resources to instantiate, deploy, and scale other resources (from other network-based services 220) to implement a variety of different services, applications, or systems. Deployment service(s) 220i may, in some embodiments, provide resource attribute propagation schemas to resource tag service 220d, as illustrated below with regard to FIG. 4.

In various embodiments, provider network 200 may implement components to coordinate the metering and accounting of client usage of network-based services, including network-based services 220e-220l, such as by tracking the identities of requesting clients, the number and/or frequency of client requests, the size of data stored or retrieved on behalf of clients, overall storage bandwidth used by clients, class of storage requested by clients, or any other measurable client usage parameter. Provider network 200 may also implement financial accounting and billing service(s) 220b, or may maintain a database of usage data that may be queried and processed by external systems for reporting and billing of client usage activity. In certain embodiments, provider network 200 may implement components (e.g., metering service(s) 220a) that may be configured to collect, monitor and/or aggregate a variety of service operational metrics, such as metrics reflecting the rates and types of requests received from clients, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients to enable such clients to monitor their usage of network-based services.

In some embodiments, provider network 200 may implement components to implement user authentication and access control procedures, such as access management service(s) 220c, for provider network 200 resources. For example, for a given network-based services request to access a particular compute instance, provider network 200 may implement components configured to ascertain whether the client associated with the access is authorized to configured or perform the requested task. Authorization may be determined such by, for example, evaluating an identity, password or other credential against credentials associated with the resources, or evaluating the requested access to the provider network 200 resource against an access control list for the particular resource. For example, if a client does not have sufficient credentials to access the resource, the request may be rejected, for example by returning a response to the requesting client indicating an error condition. In at least some embodiments resource tag service 220d, discussed in more detail below with regard to FIGS. 3-5, may provide access to and management of resource attributes, such as tags, maintained for resources implemented at different network-based services.

Network-based services implemented as part of provider network 200 may each implement respective programmatic interfaces, in some embodiments. For example, requests directed to virtual computing service 220e may be formatted according to an API for virtual computing service 220e, while requests to storage service(s) 220g may be formatted according to an API for storage service(s) 220g. Different portions of the various APIs may be exposed to external clients, in some embodiments, with some other portions remaining available to internal clients, such as other network-based services in provider network 200. A provider network for network-based services platform 200 may also be implemented, in some embodiments, as interface 210. Interface 210 may be a programmatic interface and/or a graphical user interface (e.g., hosted on a network-based site for the provider network). Interface 210 may allow various requests, such as those discussed below with regard to FIGS. 4-5.

Clients 250 may encompass any type of client configurable to submit requests to network-based services platform 200, in various embodiments. For example, a given client 250 may include a suitable version of a web browser, or may include a plug-in module or other type of code module configured to execute as an extension to or within an execution environment provided by a web browser. In some embodiments, clients 250 may include sufficient support to send the requests according to various programmatic interfaces for the service, as well as other supported protocols at the resources (e.g., Hypertext Transfer Protocol (HTTP)) for generating and processing network-based service requests without necessarily implementing full browser support. In some embodiments, clients 250 may be configured to generate network-based services requests according to a Representational State Transfer (REST)-style network-based services architecture, a document- or message-based network-based services architecture, or another suitable network-based services architecture. In some embodiments, a client 250 (e.g., a computational client) may be configured to provide access to network-based resource in a manner that is transparent to applications implemented on the client 250 utilizing the provider network resource.

Clients 250 may convey network-based services requests to provider network 200 via network 260. In various embodiments, network 260 may encompass any suitable combination of networking hardware and protocols necessary to establish network-based communications between clients 250 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network. It is noted that in some embodiments, clients 250 may communicate with network-based service using a private network rather than the public Internet.

Figure 3:
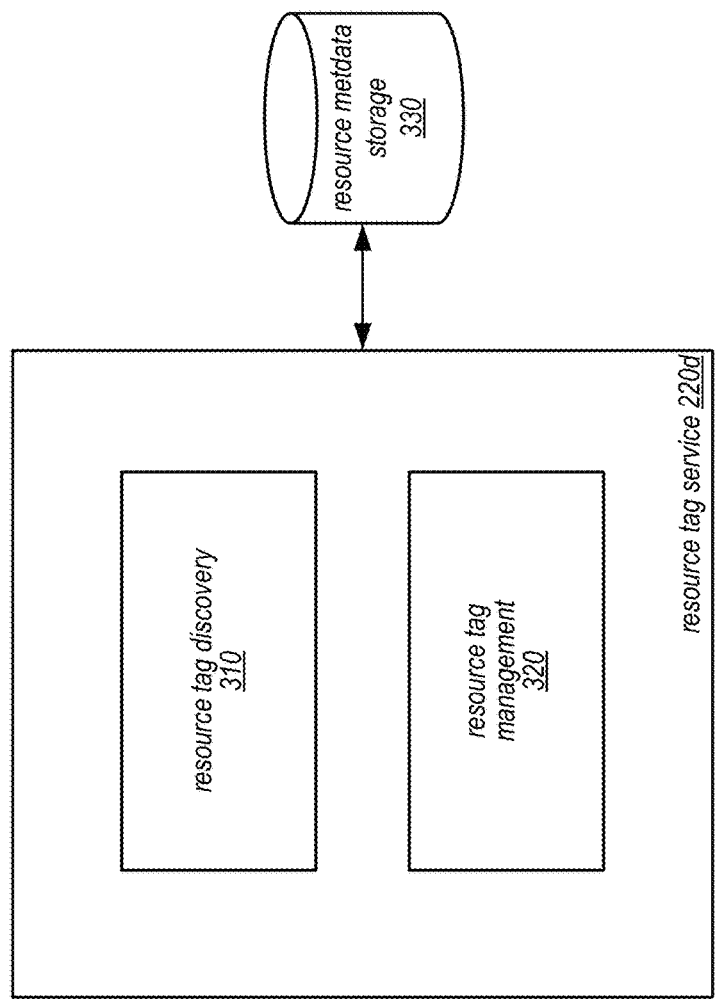
FIG. 3 is a block diagram illustrating a resource tag service that may provide automatic propagation of resource attributes according to a resource attribute propagation schema, according to some embodiments.

FIG. 3 is a block diagram illustrating a resource tag service that may provide automatic propagation of resource attributes according to a resource attribute propagation schema, according to some embodiments. Resource tag service 220*d*, as noted above, may provide access to and management of resource metadata maintained for resources implemented at different network-based services. As illustrated in FIG. 3, resource tag service 220*d* may implement a resource tag discovery module 310, for searching, evaluating, locating, and/or otherwise returning resource tags/or other resource attributes. Resource tag service 220*d* may also implement resource tag management component 320 to process requests to create, modify, and/or remove tags. Resource tag manager 320 may perform the various techniques described above with regard to FIG. 1, and below with regard to FIGS. 4, 6, and 7, to automatically propagate resource tags according to a resource tag propagation schema (or other propagation criteria). Resource metadata storage 330 may be accessible to resource tag service 220*d*, either as dedicated storage for resource tag service 220*d* to persistently maintained resource attributes, such as tags, and/or may be implemented as part of another service, such as database services 220*h* and/or storage services 220*g*.

In various embodiments, resource tag discovery module 310 may be configured to identify those resources that satisfy selection predicates to add resource attributes, as well as respond to requests for resource attributes, such as tags, specific to a particular resource. For example, in some embodiments resource tag discovery module 310 may act as a query engine that processes queries for particular resources/resource attributes/tags. For example, in a least some embodiments, a portion of resource metadata storage may be allocated to and/or structured for resource tag discovery module 310, such as structured for online analytical processing (OLAP). In this way, resource tag discovery module can efficiently evaluate attribution request selection predicates, as well as provide quick responses to requests for specific metadata, in various embodiments. As discussed below with regard to FIGS. 4-6, resource tag discovery 310 may be used to identify resources (for those resources that have already been identified by a previous tag request) and/or to provide propagation status, and/or completion, in some embodiments.

In some embodiments, resource tag management module 320 may be configured to apply/modify/remove resource attributes, such as tags. For example, in various embodiments resource tag management module 320 may act as a transaction engine that is configured to update resource tags and other resource attributes according to the identified resources provided by resource tag discovery module 310 for a tagging or other attribution request. In at least some embodiments, a portion of resource metadata storage 330 may be allocated to and/or structured for resource tag management module 320, such as structured for online transaction processing (OLTP). In this way, resource tag management module 320 may provide consistency to updates made to resource tags (e.g., in the event of current updates to a particular resource, resource tag, other resource attributes, etc. . . . ). Additionally, resource tag management module may be configured to perform the various techniques described below with regard to FIGS. 4, 6 and 7 for automatically propagating resource attributes according to a resource attribute propagation schema (or other propagation criteria).

Resource metadata storage 330 may provide persistent storage for resource metadata in various embodiments. In some embodiments, resource metadata storage may be configured differently for resource tag discovery and resource tag management 320, as noted above. For example, two data stores, storage engines, replicas, and/or storage services may be configured to provide the different types of storage. In at least some embodiments, storage for resource tag management 320 may push updates to the replica for resource tag discovery 310.

Figure 4:
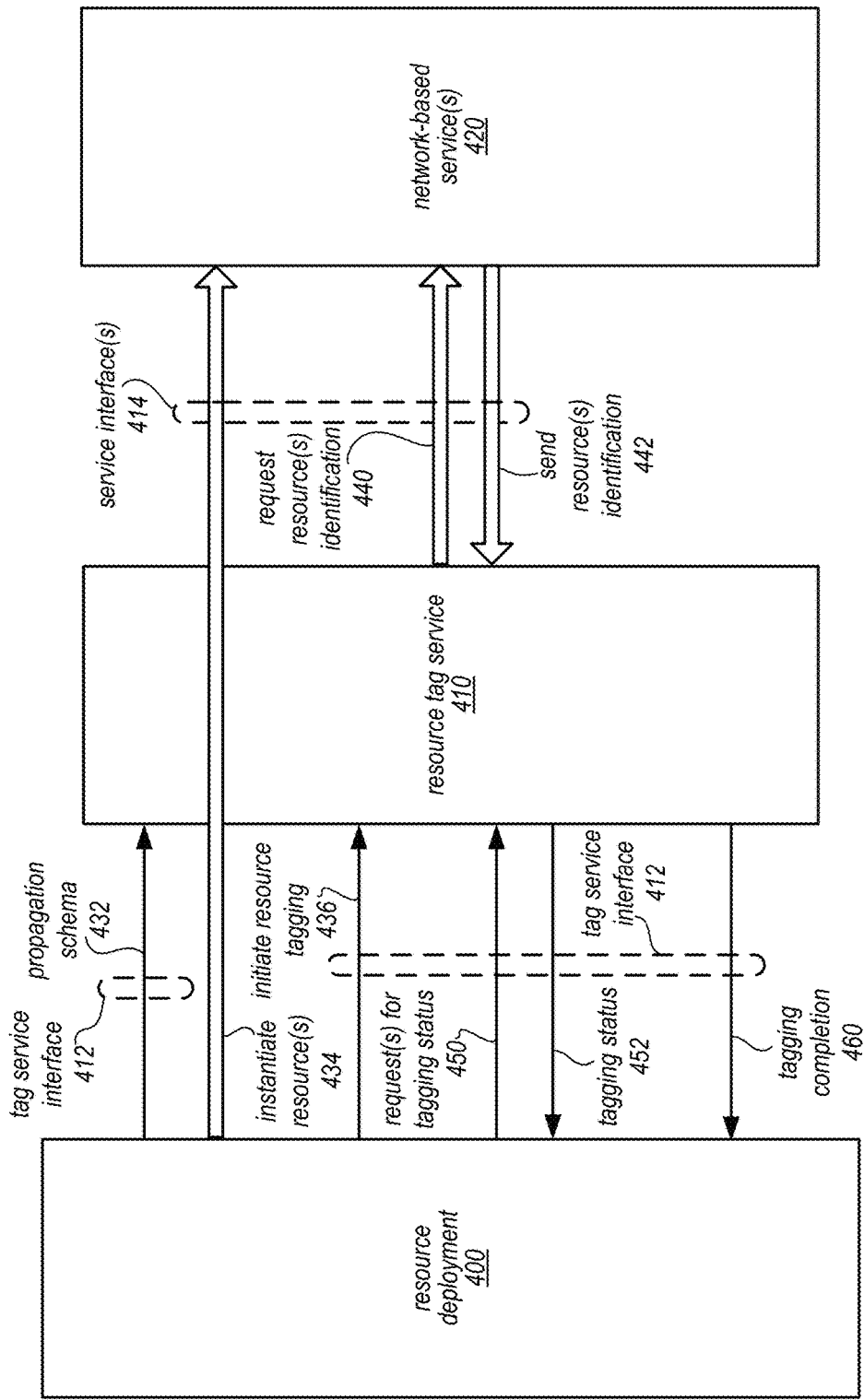
FIG. 4 is a diagram illustrating interactions among a resource deployment client, resource tagging service, and network-based services, according to some embodiments.

FIG. 4 is a diagram illustrating interactions among a resource deployment client, resource tagging service, and network-based services, according to some embodiments. Resource deployment 400 (which may be a component of a resource deployment service 220*i* in FIG. 2) may perform instantiation and deployment of resources for a client of the provider network. As illustrated in FIG. 4, resource deployment 400 may utilize a tag service interface 412 and respective service interface(s) 414 to communicate with resource tag service 410 and network-based service(s) 420 respectively. These interfaces may be programmatic (APIs) in at least some embodiments, which may or may not be internal to the provider network.

Resource deployment 400 may send a resource tag propagation schema 432 (or other propagation criteria) to resource tag service 410 via tag service interface 412. As noted above, the resource tag propagation schema may be represented in many different ways (which may be packaged for communication to resource tag service 410 according to interface 412). Resource deployment 400 may begin instantiating resource(s) 434 via service interface(s) 414 at one or more of network-based service(s) 420.

Resource deployment 400 may also send a request 436 to initiate resource tagging 436 for the resources in the resource tag propagation schema. For instance, the request 436 may include an identifier, such as a request identifier, which resource tag service 410 may use to obtain identification information for other resources. Resource tag service 410 may then request identification information 440 for resources from network-based service(s) 420 according to the logical structure identified in the resource tag propagation schema. The network-based service(s) 420 may send resource(s) identification 442, which resource tag service 410 may use to apply resource tags to the identified resources in resource metadata.

Resource deployment 400 may also request the status of propagation 450, receiving a response 452 from resource tag service via tag service interface 412. Resource tag service 410 may also provide a notification 460 tagging is complete, in some embodiments.

Figure 5:
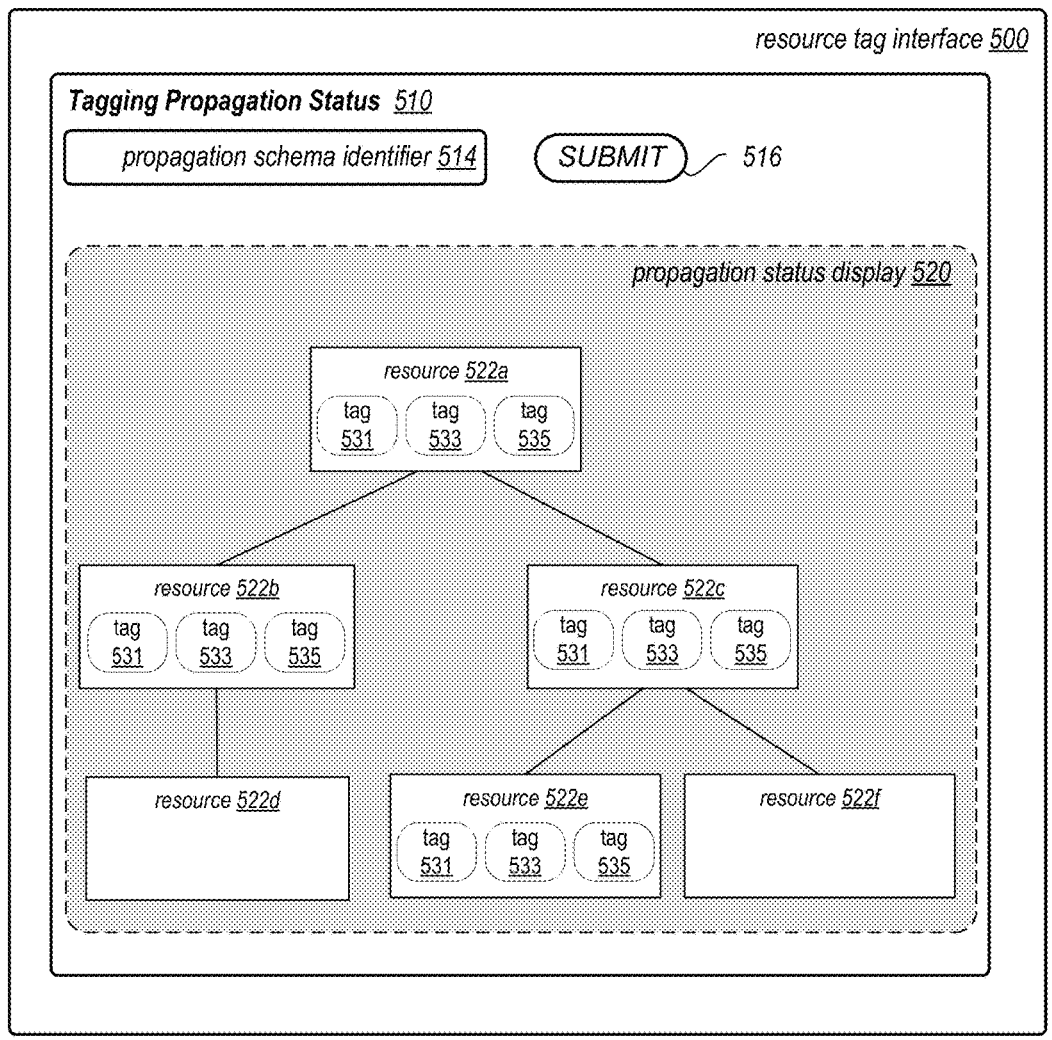
FIG. 5 is an example illustration of graphical user interface for receiving a propagation status for an initiated propagation of resource attributes according to a propagation schema, according to some embodiments.

As noted above, a provider network may offer different types of interfaces in order to implement automated management of resource attributes, such as resource tags, across network-based services. FIG. 5 is an example illustration of graphical user interface for receiving a propagation status for an initiated propagation of resource attributes according to a propagation schema, according to some embodiments. Resource tag interface 500 may be implemented as part of a provider network interface or stand alone as part of a resource tag service interface. In some embodiments, portions of the information may be displayed, presented, or adapted as part of another interface (such as resource status interface).

As illustrated in FIG. 5, resource tag interface 500 may provide various user interface elements and/or graphics to provide the status of tagging propagation being performed for a set of resources in the provider network according to a resource tag propagation schema. For example, resource tag interface 500 may implement an area tagging propagation status 510 that includes a user interface element to receive an input selection for a particular propagation scheme identifier 514 (e.g., text input, drop down list, etc.). Submit element 516 may be implemented to perform a lookup and/or display of the propagation status for the input in element 514.

Tagging propagation status area 510 may, in some embodiments, provide a display of graphical elements that represent the current status of resources, as well as the propagation of tags to those resources. Propagation status display 520 is illustrated as an example of such a graphical display, but is not intended to be limiting. Resources 522a, 522b, 522c, 522d, 522e, and 522f may be displayed according to the logical structure indicated in the resource tag propagation schema (which in this instance may be represented as a tree). Those resources that have been tagged with tags 531, 533, and 535, are displayed as containing those tags (e.g., resources 522a, 522b, 522c, and 522e). Those resources without the tags displayed, resources 522d and 522f, may have not yet been identified and/or have the resource tags applied. Please note, that in some embodiments, other resource tags for the resources (which were added by other requests, systems, etc., that are not applied according to the resource tag propagation schema) may also be included (not illustrated in FIG. 5). Please note that FIG. 5 is intended as an example of a display of propagation status, and is not intended to be limiting as to other ways of displaying propagation status or providing propagation status (e.g., displaying text or providing responses that include status).

Figure 6:
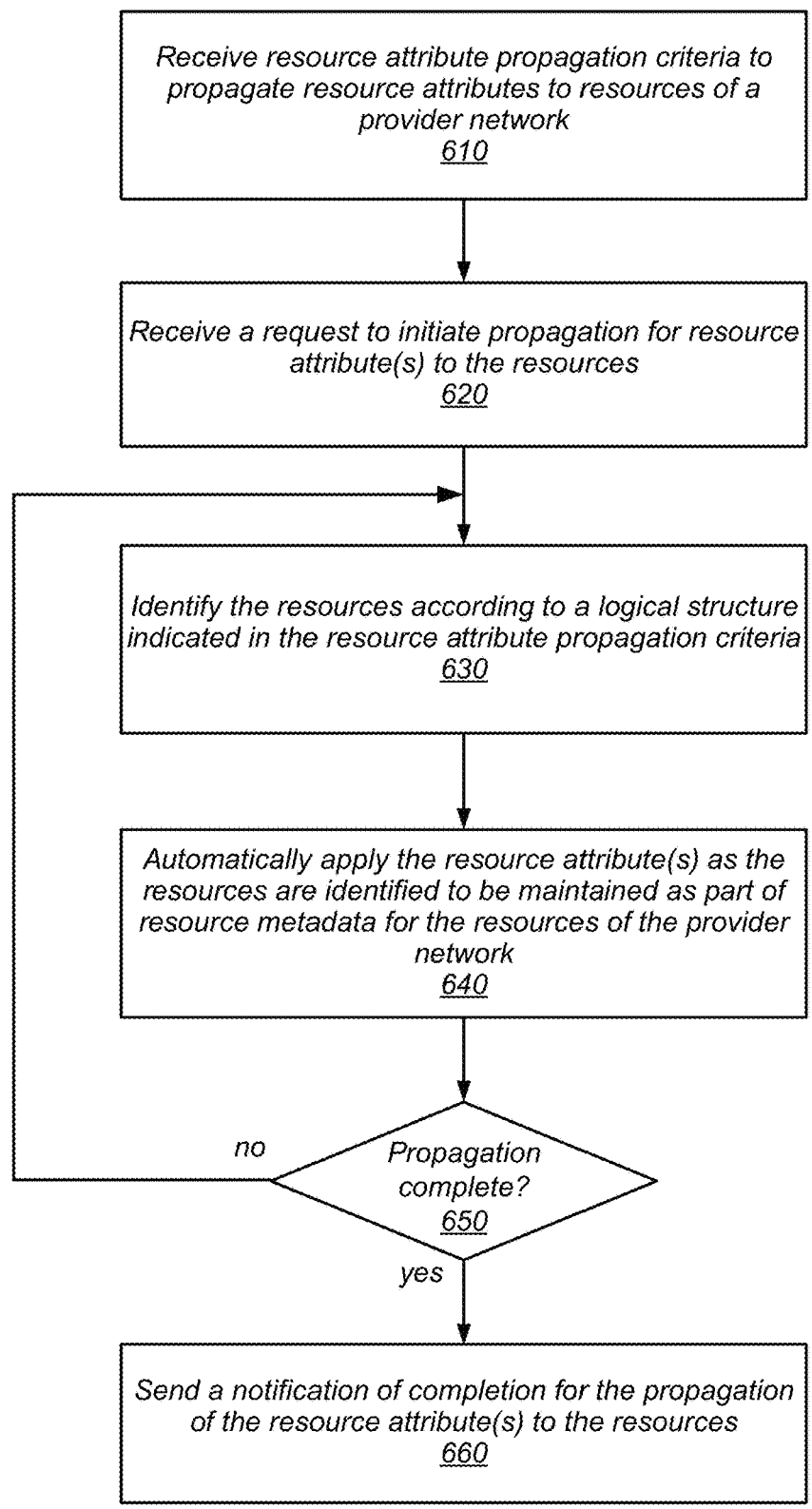
FIG. 6 is high-level flowchart illustrating various methods and techniques for implementing automatic propagation of resource attributes in a provider network according to resource attribute propagation criteria, according to some embodiments.

The clients, provider network, network-based services, resource tag services, and other components that implement automated management of resource attributes across network-based services discussed above with regard to FIGS. 1-5 have been given as examples. Various other types or configurations of clients, provider network, network-based services, resource tag or attribute services, and other components may implement these techniques. Thus, FIG. 6 is high-level flowchart illustrating various methods and techniques for implementing automatic propagation of resource attributes in a provider network according to resource attribute propagation criteria, according to some embodiments.

Resources may be implemented at the same and/or different network-based services of a provider network. As discussed above with regard to FIG. 2, a provider network may offer multiple different types of services, which may correspondingly provide different types of resources for use by a client of the provider network. Resource attributes, such as various resource tags, labels, sets of metadata, or other descriptive information may be maintained describing the various resources implemented for a client. For example, resource attributes may describe a particular resource identifier (e.g., which may be unique for the provider network), resource type, and/or location of the resource. In at least some embodiments, a provider network may include multiple different regions or locations, each of which may maintain resource metadata for the resources implemented as part of the services within the respective region.

In various embodiments, it may be desirable to apply a common set of resource attribute(s) to multiple resources which together make up some entity, system, collection, or service for a client of the provider network. Resource attribute propagation criteria may be used to apply the common set of resource attribute(s) to the multiple resources. Moreover, in at least some embodiments, the different ones of the multiple resources may be deployed, configured, and/or managed differently, some of which may be dependent upon other resources to deploy, and thus the propagation of resource attribute(s) may be performed to account for the different ways in which the multiple resources are implemented.

As indicated at 610, resource attribute propagation criteria may be received to propagate resource attributes to resources in a provider network, in various embodiments. The resource attribute propagation criteria may include an indication of a logical structure for the resources. For instance, in at least some embodiments a graph of the resources may be included, such as discussed above with regard to FIG. 1, which may provide one or more multiple paths or orderings in which resource attributes can be applied. For instance, a graph may be represented as an adjacency list, identifying edges between resources that provide an ordering for applying resource attributes. Please note that multiple other representations and/or formats of the logical structure of the resources may be provided, such as various lists, arrays, trees, or any other logical structure that provides an ordering (or set of orderings) for applying resource attributes to resources in the provider network. For example, the logical structure may be represented in such a way as to provide an ordering that tracks with an order in which the resources are deployed or instantiated in the provider network. The resource attribute propagation criteria may be received from a deployment system, agent, or service implemented as part of the provider network, such as deployment service(s) 220i, or may be provided from a client of the provider network that is external to the provider network, such as client 250 in FIG. 2.

As indicated at 620, a request may be received to initiate propagation for resource attribute(s) to the resources identified in the propagation schema, in various embodiments. For example, the request may include the resource attributes to apply, as well as identification information for a first resource to apply the resource attributes to. Thus, a request identifier, resource identifier, or other metadata may be included to initiate propagation at one of the resources in the resource attribute propagation criteria. Please note, that while in some embodiments, one or more of the resources may not be deployed prior to receiving the request to initiate propagation, in other embodiments, all of the resources may be already deployed.

In response to receiving the request to initiate propagation, the resources identified in the resource attribute propagation schema may be identified according to the logical structure of the resource attribute propagation criteria, as indicated at 630 in various embodiments. For example, the resource attribute propagation schema, may identify a template of the resources, identifying the type, kind, or other general description of the resource, but may not identify the specific instantiation of that resource (e.g., instance, storage volume, cluster, workflow engine, endpoint, or other system, component, or device implementing the resource) deployed in the provider network. Thus, respective identification information for the resources may be obtained, in various embodiments, in order to identify the specific resources in the provider network. For example, in some embodiments, network-based services implementing the resources may register or provide the identification information to a centralized resource attribute manager (e.g., resource tag service 220d in FIG. 2) upon creation of the resources. In some embodiments, a monitoring or tracking system may monitor the activity of different network-based services to determine when resources are deployed, and the respective identification information for the resources. As discussed below with regard to FIG. 7, the centralized resource attribute manager may request or proactively obtain the identification information, in some embodiments.

For those resources that are identified, the resource attributes may be automatically applied to be maintained as part of resource metadata for the resources of the provider network, as indicated at 640. For example, a resource data store or other form storage maintaining resource metadata may be written/to or updated to link the resource attributes to the identification information of the resource. The identification information may be a resource identifier, request identifier, and/or any other metadata describing the resource which may be used to apply resource attributes to the resource in the resource metadata. A new entry, for instance in a database table maintaining resource metadata may be created for the resource that includes the identification information, and the resource attributes that are applied. As noted earlier, the resource metadata may be stored in a structured data store configured to perform online transaction processing (OLTP) in order to provide consistent updates to resource metadata for resources.

Application of the resource attributes may be performed as the resources are identified, in various embodiments. Thus, not all resources may be identified at once, for instance. As illustrated in FIG. 6, the identification of resources and the application of resources may continue until propagation to the resources identified in the resource attribute propagation schema is complete, as indicated by the positive exit from 650. For instance, unidentified resources may be tracked or maintained in a list until identified so that resource attributes are applied. In at least some embodiments, requests for propagation status may be received (e.g., from a client or deployment system that provided the resource attribute propagation schema). The status may provide the current state of propagation (e.g., started, pending, waiting, or complete). In some embodiments, the status may provide an indication of the resources for which the tags have already been applied, such as discussed above with regard to FIG. 5.

As indicated at 660, upon completion of the propagation of the resource attributes, a notification of completion may be sent for the propagation of the resource attribute(s) to the resources. The notification may be formatted according to an API and sent as a message. In some embodiments, the notification may be written/sent to a storage or message service, which may be read (or polled) to determine when propagation is complete (e.g., by a client or deployment system).

In at least some embodiments, resource attribute propagation criteria may be persistently stored, either for future use to apply other resource attributes to the resources in the resource attribute propagation criteria, or so that interruptions, such as the failure of a resource attribute manager, may resume propagation of resource tags. Multiple resource attribute propagation criteria may be stored for the same or different clients or deployment systems.

Figure 7:
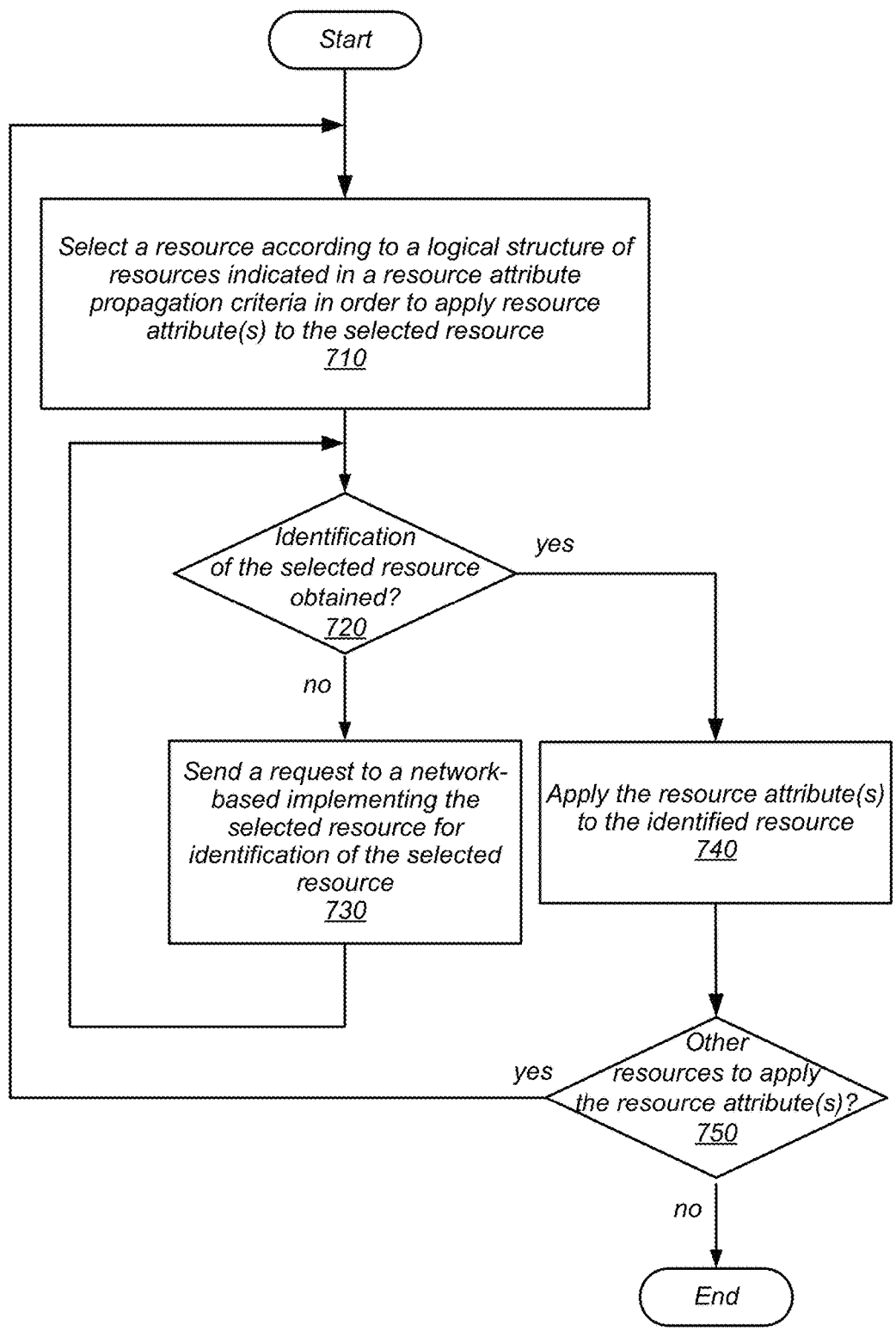
FIG. 7 is a high-level flowchart illustrating various methods and techniques for identifying resources of a provider network according to resource attribute propagation criteria, according to some embodiments.

In at least some embodiments, resources indicated in a resource attribute propagation schema may be implemented across many different network-based services. As discussed above with regard to FIG. 2, the different types of network-based services may offer different kinds of resources, from data stores and computational resources that provide specific resources to clients, to deployment and management services that coordinate, manipulate, or operate multiple different resources to perform various tasks or functions. These networks may deploy, manage, and/or operate resources very differently from one network-based service to another. It may be that these network-based services handle resource identification information differently as well. Instead of relying upon the network-based services to provide resource identification information for applying resource attributes independently (which may result in divergent reporting times and/or information reported), a centralized system, component, or device, such as resource attribute manager 120 in FIG. 1 or resource tag service 220d in FIG. 2, may be implemented to interface with the different network-based services to collect resource identification from the network-based services without waiting on the network-based services to first provide the identification. FIG. 7 is a high-level flowchart illustrating various methods and techniques for identifying resources of a provider network according to resource attribute propagation criteria, according to some embodiments. Note that although multiple network-based services are discussed with regard to the technique below, the same technique may be applied to multiple network-based services implemented at the same network-based service, and thus the following discussion is not intended to be limiting as to the number of resources or network-based services providing the resources.

Propagation for resource attribute(s) for indicated in resource propagation criteria may be initiated. As indicated at 710, in some embodiments, a resource may be selected according to a logical structure of resources indicated in the resource attribute propagation schema in order to apply the resource attribute(s) to the selected resource. As discussed above with regard to FIGS. 1 and 6, the logical structure of the resource attribute propagation criteria may be represented in different ways and may provide one or multiple orderings for selecting resources to apply. For example, in a least some embodiments, the resource attribute propagation criteria may be represented as a graph, such as a tree, where relationships between resources may be evaluated to determine an order in which resources should have resource attributes applied. For instance, the graph may indicate a resource in a network-based service that initializes the performance of other services indicated in the resource propagation criteria, such as a resource in a deployment service which deploys data storage, computation, and workflow services. In this example, the propagation criteria may indicate that the first resource to be selected may be the deployment resource. In some embodiments, the logical structure of the resources may be ordered according to a deployment and/or management hierarchy (e.g., the deployment service provisions the different resources, therefore the deployment service resource may be selected first—as the other resources may not yet be deployed, and thus have no identification yet).

Once selected, it may be determined whether identification for the selected resource has already been obtained, as indicated at 720. For example, in some embodiments, some network-based services may add resource attributes specific to the network-based service to resources, and thus the identification of the resource may already be available in resource metadata maintained in a database or other data store. A query or other evaluation based on a request identifier, or other resource identification information that facilitates the application of resource attributes may be performed upon the resource metadata to determine whether the selected resource has already been identified and/or added to the resource metadata (and thus available to have additional resource attributes applied). If the identification of the selected resource is already obtained, as indicated by the positive exit from 720, then the resource attributes may be applied to the identified resource, as indicated at 740.

For those selected resources where identification is not obtained, as indicated by the negative exit from 720, a request may be sent to a network-based service implementing the selected resource for identification of the selected resources, as indicated at 730. The request may be formatted and sent via a programmatic interface (API) for the network-based service, in some embodiments. A response to the request may be received from the network-based service, including the identification of the selected resource (e.g., a resource identifier, request identifier, and/or any other metadata describing the resource which may be used to apply resource attributes to the selected resource in resource metadata at 740). In at least some embodiments, the network-based service may provide the identification of the resource in another request (e.g., a request to register/add resource attributes for the selected resource as part of a deployment technique or workflow). Thus, the identification of the selected resource may be received prior to a response to the request for the identification information is received from the network-based service. As illustrated by the arrow from element 730 to before element 720, a waiting period until the identification is obtained may be implemented. In at least some embodiments, the resource metadata may be periodically or aperiodically checked to see if the identification information has been obtained (as a result of a different request or message other than a response to the identification request). A received response to the identification request may also trigger the application of the resource attributes, as indicated at 740.

Once resource attribute(s) are applied to the identified resource, as indicated at 740, another resource attribute may be selected, as indicated by the positive exit from 750, until the resource attribute(s) have been applied to the remaining resources. In at least some embodiments, this technique may be performed in parallel (according to the logical structure of the resources indicated resource attribute propagation schema) for multiple select resources at a time. For example, if the resource attribute propagation criteria is tree graph, then the resources at the same depth of the tree may be identified at the same time (e.g., sending the request, as indicated at 730). In at least some embodiments, multiple resources may be selected, and the identification of resources obtained in parallel.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the client and/or provider network described herein). The various methods as illustrated in the figures and described herein represent example embodiments of methods. The order of any method may be changed, and various elements may be added, reordered, combined, omitted, modified, etc.

Figure 8:
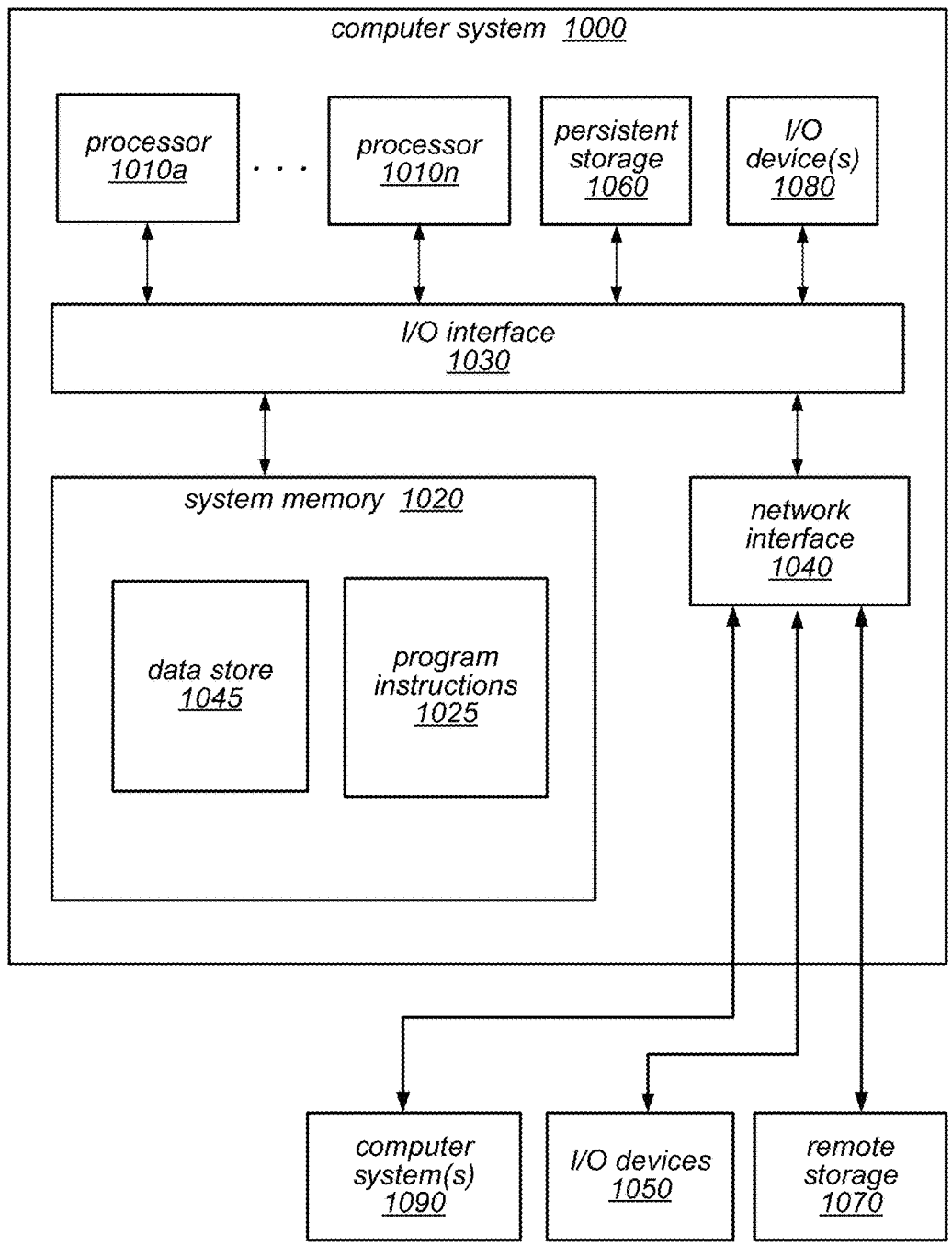
FIG. 8 is a block diagram illustrating an example computing system, according to some embodiments.

Embodiments of automatic propagation of resource attributes in a provider network according to propagation criteria as described herein may be executed on one or more computer systems, which may interact with various other devices. FIG. 8 is a block diagram illustrating an example computer system, according to various embodiments. For example, computer system 1000 may be configured to implement nodes or resources of a provider network, network-based service, a data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the system described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a resource tag service, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A provider network, comprising:
a plurality of compute nodes configured to provide a plurality of resources for a client of the provider network;
a resource tag manager for the provider network, implemented via one or more hardware processors, configured to:
receive a resource tag propagation schema to propagate resource tags to individual ones of the plurality of resources for the client, wherein the resource tag propagation schema indicates a logical structure of the plurality of resources;
receive a request to initiate propagation of one or more resource tags to the plurality of resources;
in response to the receipt of the request to initiate propagation of the one or more resources tags:
obtain respective identification for the individual ones of the plurality of resources according to the logical structure indicated in the resource tag propagation schema; and
automatically apply the one or more resource tags to link the respective identification obtained for the individuals resources to the one or more resource tags in resource metadata maintained for the plurality of resources.

2. The system of claim 1,
wherein the plurality of resources are implemented as part of one or more different network-based services offered at the provider network; and
wherein, to obtain the respective identification for the individual ones of the plurality of resources, the resource tag manager is configured to send identification requests to the one or more different network-based services for at least one of the individual resources.

3. The system of claim 1, wherein the resource tag manager is further configured to:
in response to completion of the propagation of the one or more resource tags to the plurality of resources, send a notification of completion for the propagation request.

4. The system of claim 1, wherein the plurality of compute nodes are part of a larger collection of compute nodes that implement a plurality of different network-based services offering respective resources to a plurality of clients including the client, wherein at least one of the plurality of resources is implemented in a different network-based service than another one of the plurality of resources, wherein one of the different network-based services is a resource deployment service configured to deploy the plurality of resources for the client, and wherein the resource tag propagation schema and the request to initiate the propagation of the one or more resource tags are received from the deployment service.

5. A method, comprising:
performing, by one or more computing devices:
receiving a resource attribute propagation criteria to propagate resource attributes to individual ones of a plurality of resources of a provider network, wherein the resource attribute propagation criteria indicates a logical structure of the plurality of resources;
receiving a request to initiate propagation of one or more resource attributes to the plurality of resources;
in response to receiving the request to initiate propagation of the one or more resources attributes:

identifying the individual ones of the plurality of resources according to the logical structure indicated in the resource attribute propagation criteria; and automatically applying the one or more resource attributes to be maintained as part of resource metadata for the plurality of resources as the individual resources are identified.

6. The method of claim 5,
wherein the plurality of resources are implemented as part of one or more different network-based services offered at the provider network;
wherein identifying the individual ones of the plurality of resources according to the logical structure indicated in the resource attribute propagation criteria, comprises sending identification requests to the one or more different network-based services for at least one of the individual resources; and
wherein identifying the individual ones of the plurality of resources is based, at least in part, one or more responses to the identification requests including the requested identification received from the one or more different network-based services.

7. The method of claim 5,
wherein the plurality of resources are implemented as part of one or more different network-based services offered at the provider network;
wherein identifying the individual ones of the plurality of resources is based, at least in part, identification of one or more of the plurality of resources received from the one or more different network-based services.

8. The method of claim 5, wherein one or more of the plurality of resources are not deployed at the provider network prior to receiving the request to initiate the propagation of the one or more resource attributes.

9. The method of claim 5, wherein the plurality of resources are deployed at the provider network prior to receiving the request to initiate the propagation of the one or more resource attributes.

10. The method of claim 5, further comprising:
in response to completion of the propagation of the one or more resource tags to the plurality of resources, sending a notification of completion for the propagation request.

11. The method of claim 5, further comprising:
in response to receiving a request for propagation status, providing a status notification, wherein status notification comprises an indication of those individual resources of the plurality of resources to which the one or more resource attributes are currently applied.

12. The method of claim 11, wherein the status notification is provided via a graphical user interface for the provider network, and wherein the status notification is graphically displayed according to the logical structuring indicated in the resource attribution propagation scheme.

13. The method of claim 5, wherein one of the different network-based services is a resource deployment service configured to deploy the plurality of resources for the client, and wherein at least one of the plurality of resources is implemented in a different network-based service of the plurality of network-based services than another one of the plurality of resources.

14. The method of claim 5, wherein the resource attribute selection criteria is represented as a tree structure.

15. A non-transitory, computer-readable storage medium, storing program instructions that when executed by one or more computing devices cause the one or more computing devices to implement:
receiving a resource attribute propagation schema to propagate resource attributes to individual ones of a plurality of resources of a provider network, wherein the resource attribute propagation schema indicates a logical structure of the plurality of resources;
receiving a request to initiate propagation of one or more resource attributes to the plurality of resources;
in response to receiving the request to initiate propagation of the one or more resources attributes:
identifying the individual ones of the plurality of resources according to the logical structure indicated in the resource attribute propagation schema; and
automatically applying the one or more resource attributes to be maintained as part of resource metadata for the plurality of resources as the individual resources are identified.

16. The non-transitory, computer-readable storage medium of claim 15,
wherein the plurality of resources are implemented as part of one or more different network-based services offered at the provider network;
wherein, in identifying the individual ones of the plurality of resources according to the logical structure indicated in the resource attribute propagation schema, the program instructions cause the one or more computing devices to further implement sending identification requests to the one or more different network-based services for at least one of the individual resources; and
wherein identifying the individual ones of the plurality of resources is based, at least in part, one or more responses to the identification requests including the requested identification received from the one or more different network-based services.

17. The non-transitory, computer-readable storage medium of claim 15, wherein the logical structure indicated in the resource attribute propagation schema is a graph structure of the plurality of resources.

18. The non-transitory, computer-readable storage medium of claim 14, wherein the one or more computing devices implement a resource attribute manager for the provider network, and wherein the resource attribute propagation schema is received via a programmatic interface for the resource attribute manager.

19. The non-transitory, computer-readable storage medium of claim 15, wherein the plurality of resources are implemented at the provider network for a client of the provider network, and wherein the resource attribute propagation schema is received from the client.

20. The non-transitory, computer-readable storage medium of claim 15, wherein one or more of the plurality of resources are not deployed at the provider network prior to receiving the request to initiate the propagation of the one or more resource attributes.

21. The non-transitory, computer-readable storage medium of claim 15, wherein the program instructions cause the one or more computing devices to further implement:
in response to completion of the propagation of the one or more resource tags to the plurality of resources, sending a notification of completion for the propagation request.

* * * * *